(12) United States Patent
Mojarradi et al.

(10) Patent No.: US 6,516,604 B2
(45) Date of Patent: Feb. 11, 2003

(54) MICRO-COLLOID THRUSTER SYSTEM

(75) Inventors: Mohammad M. Mojarradi, La Canada, CA (US); James Polk, Pasadena, CA (US); Colleen Marrese, Pasadena, CA (US); Juergen Mueller, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/819,182

(22) Filed: Mar. 27, 2001

(65) Prior Publication Data

US 2002/0023427 A1 Feb. 28, 2002

Related U.S. Application Data

(60) Provisional application No. 60/192,647, filed on Mar. 27, 2000.

(51) Int. Cl.[7] .................................................. F03H 5/00
(52) U.S. Cl. ........................ 60/202; 60/204; 313/231.01
(58) Field of Search ............................... 60/202, 203.1, 60/204; 313/231.01, 359.1, 363.1, 362.1; 315/5.41, 5.42, 111.01

(56) References Cited

U.S. PATENT DOCUMENTS

| | | | | |
|---|---|---|---|---|
| 3,120,736 A | * | 2/1964 | Gignoux | 60/202 |
| 3,122,882 A | * | 3/1964 | Schultz et al. | 60/202 |
| 3,173,246 A | * | 3/1965 | Norgren | 60/202 |
| 3,512,362 A | * | 5/1970 | Daley | 60/202 |
| 3,545,208 A | * | 12/1970 | Stark et al. | 60/202 |
| 3,754,397 A | * | 8/1973 | Kidd et al. | 60/202 |
| 3,789,608 A | | 2/1974 | Free | |
| 6,216,445 B1 | * | 4/2001 | Byers et al. | 60/203.1 |

OTHER PUBLICATIONS

A. Desai, S.W. Lee, Y.C. Tai, A Mems Electrostatic Particle Transportation System, Caltech Micromachining Laboratory, Electrical Engineering 136–93; California Institute of Technology; *IEEE*, 1998, pp. 121–126.

* cited by examiner

*Primary Examiner*—Michael Koczo
(74) *Attorney, Agent, or Firm*—Fish & Richardson P.C.

(57) ABSTRACT

A micro-colloid thruster system may be fabricated using micro electromechanical system (MEMS) fabrication techniques. A beam of charged droplets may be extracted from an emitter tip in an emitter array by an extractor electrode and accelerated by an accelerator electrode to produce thrust. The micro-colloid thruster system may be used as the main propulsion system for microspacecraft and for precision maneuvers in larger spacecraft.

11 Claims, 5 Drawing Sheets

MICRO-COLLOID THRUSTER SYSTEM

CROSS-REFERENCE TO RELATED APPLICATIONS

This application claims priority to U.S. Provisional Patent Application Serial No. 60/192,647, filed on Mar. 27, 2000.

ORIGIN OF INVENTION

The invention described herein was made in the performance of work under a NASA contract, and is subject to the provisions of Public Law 96-517 (35 U.S.C. 202) in which the Contractor has elected to retain title.

BACKGROUND

Microspacecraft, also referred to as micro-,nano-, or picosatellites, depending on their size, may range in mass from under a kilogram to the tens of kilograms. Microspacecraft architectures are being considered for scientific exploration missions beyond earth orbit as well as near-earth military missions.

The use of multiple microspacecraft may increase survivability of a mission by providing redundancy and/or increase the overall capability of the system. For example, an antenna array including multiple microspacecraft, each equipped with its own antenna, may enable very high resolution observations of Earth. The reliability of the system may also be increased because the use of multiple microspacecraft provides functional redundancy, and loss of one, or even a few, microspacecraft in the array may not represent a catastrophic failure.

Making microspacecraft viable for such applications requires substantial reductions in size, weight, and power for each spacecraft subsystem. For example, micropropulsion systems capable of thrust levels in the milli-Newton range and capable of impulse bits as little as $10^{-6}$ N*s may be required in order to perform repositioning maneuvers with the degree of precision necessary for such miniature spacecraft.

SUMMARY

A micro-colloid thruster module is described. According to an embodiment, the module may be fabricated using silicon processing techniques, including micro electromechanical system (MEMS) techniques. The thruster module may include a number of emitters arranged in an array. Each emitter includes a propellant inlet for receiving a liquid propellant, e.g., a doped glycerol, an emitter tip, an extractor electrode, and an accelerator electrode. A voltage applied to the extractor electrode produces an electric field at the emitter tip, causing the tip to emit a beam of charged droplets.

A voltage converter converts a bus voltage to an accelerator voltage, which may be about 2 kV to 20 kV. The accelerator voltage is applied to the accelerator electrodes to accelerate the charged droplets as they exit the module.

In an embodiment, the voltage converter utilizes a transformer and a stacked array of capacitors and diodes to increase the bus voltage to the accelerator voltage. In another embodiment, an array of accelerator electrodes in an accelerator section step up the voltage to the accelerator voltage.

A controller may be provided to selectively activate emitters in the module in order to control the direction and amount of thrust. The thruster may have dimensions of on the order of about 0.1 to 1.0 cm, and provide thrust up to about 50 μm and impulses of about 500 seconds to 2000 seconds.

DETAILED DESCRIPTION

Figure 1:
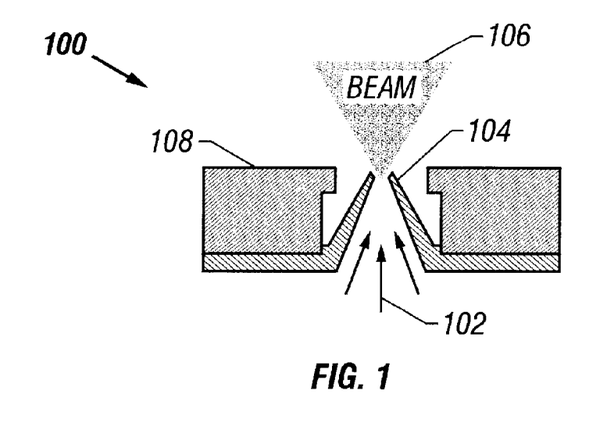
FIG. 1 is a cross-sectional view of an emitter according to an embodiment.

A colloid thruster device provides a beam of charged liquid droplets to produce thrust. The beam of charged droplets may be accelerated electrostatically. A micro-colloid emitter 100 for use in a thruster module according to an embodiment includes a propellant inlet 102 located below an emitter tip 104, as shown in FIG. 1. A beam 106 of charged droplets of a liquid propellant may be extracted from the emitter 104 by an electric field generated between the emitter tips by an extractor electrode 108.

In an embodiment, glycerol may be used as a propellant. The glycerol propellant may be doped with a salt, such as sodium iodine, to increase its charge carrying capacity. An electric field on the order of 106 V/cm may be applied at the emitter tips 104 to extract the charged droplets from the propellant inlet 102.

Figure 2:
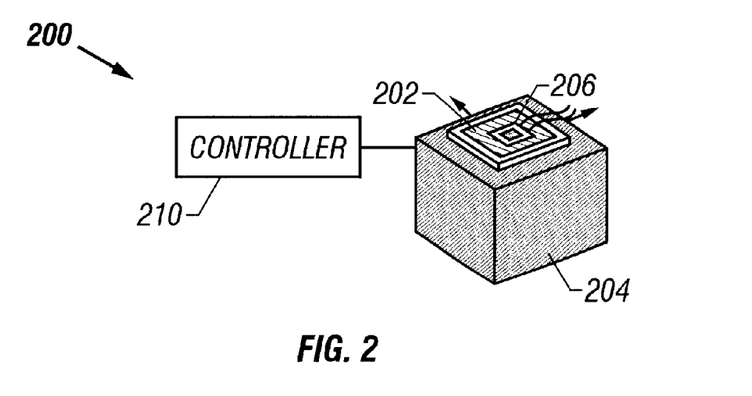
FIG. 2 is a perspective view of a micro-colloid thruster system according to an embodiment.

FIG. 2 illustrates a micromachined thruster module 200 including a four-sided emitter array 202. The thruster module is provided on a propellant tank 204, which may include a capillary feed network supplying the emitters in the array. The thruster module may operate on a low bus voltage, e.g., about 3–5 volts. The voltage supplied by the bus may be increased to a voltage sufficient to extract and accelerate charged droplets from the emitter.

A controller 210 controls one or more emitters in the thruster module 202 to eject beams of charged droplets in order to produce thrust. The charge on the droplets in the beams may be neutralized in order to prevent charging the adjacent spacecraft surfaces. Beam neutralization may be achieved using a Field Emitter Array (FEA) cathode. The FEA structure 206 may be fabricated on a separate chip and bonded to the thruster module after fabrication.

The thruster module 202 may be fabricated using micro electromechanical system (MEMS) fabrication techniques. MEMS fabrication techniques use the processes and materials of microelectronics, e.g., batch processing of silicon wafers, to construct miniaturized systems that include both electrical and mechanical components. Mechanical components in MEMS, like transistors in microelectronics, produce micron sized features in numbers ranging from a few to millions.

Figure 3:
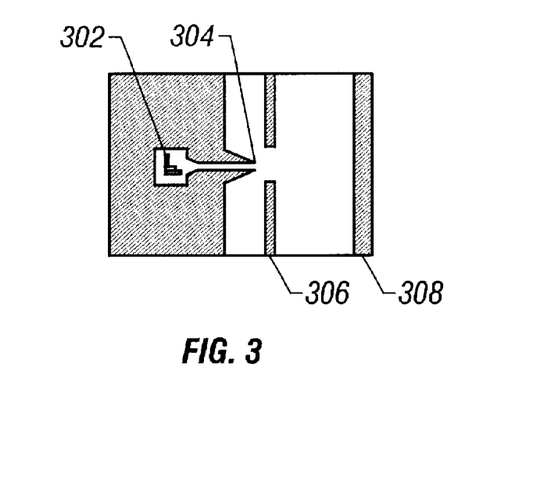
FIG. 3 is a cross-sectional view of an emitter with an accelerator electrode according to an embodiment.

In an embodiment, each emitter in the thruster module includes a propellant inlet 302, emitter tip 304, an extractor electrode 306, and an accelerator electrode 308, as shown in FIG. 3. The emitter tip 304 may be formed as a slit having a width of about 1 $\mu$m and a depth of about 30 $\mu$m.

Figure 4:
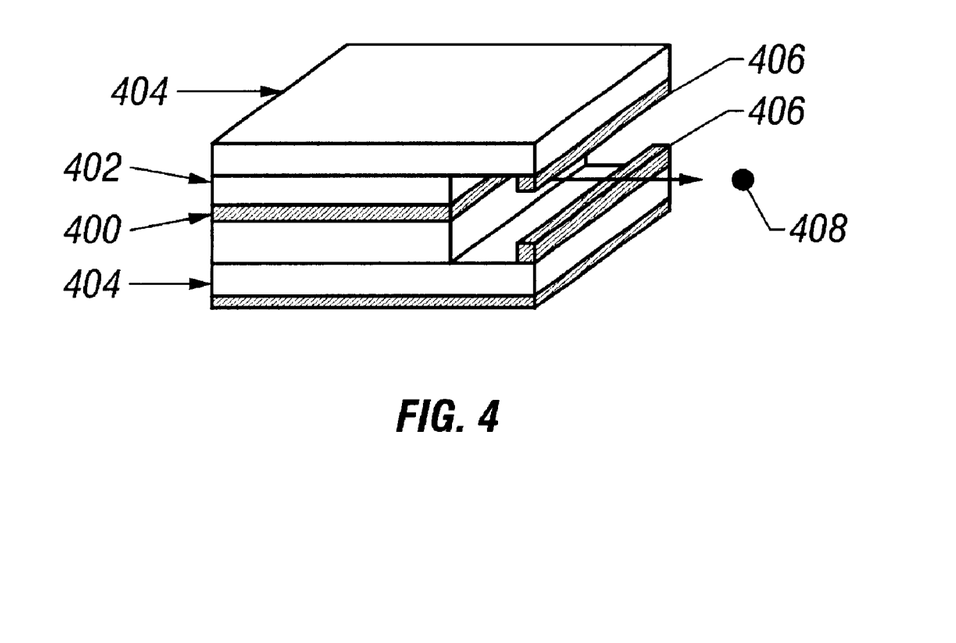
FIG. 4 is a perspective view of a thruster module according to an embodiment.

The emitter tip 304 and the extractor electrode 306 may be formed on a Silicon-on-Insulator (SOI) silicon wafer 400 using a-deep reactive ion etching (DRIE) system. A cover wafer 402 may be anodically bonded to the emitter/extractor structure to seal the structure and the liquid propellant flow channels, as shown in FIG. 4. The cover wafer may be a glass, such as, for example, Pyrex®, a borosilicate glass product developed by Corning Incorporated. The resulting structure is sandwiched between two silicon chips 404, each of which include thin-film deposited accelerator electrodes 406.

The extractor electrode 306 may be spaced apart from the emitter tip 304 by a gap of about 1 $\mu$m. Charged droplets may be extracted from the emitter tip by applying a voltage of about 100 V to the extractor electrode 306, which generates a field of about $10^6$ V/cm at the emitter tip 304. A voltage of about 10 kV may be applied to the accelerator electrodes 406, causing the emitted charged droplet 408 to accelerate as it exits the thruster module. The accelerator electrodes may be spaced apart from the emitter by a channel about 5 mm wide, resulting in a field strength at the tip of about 2 V/cm at 10 kV.

Figure 5:
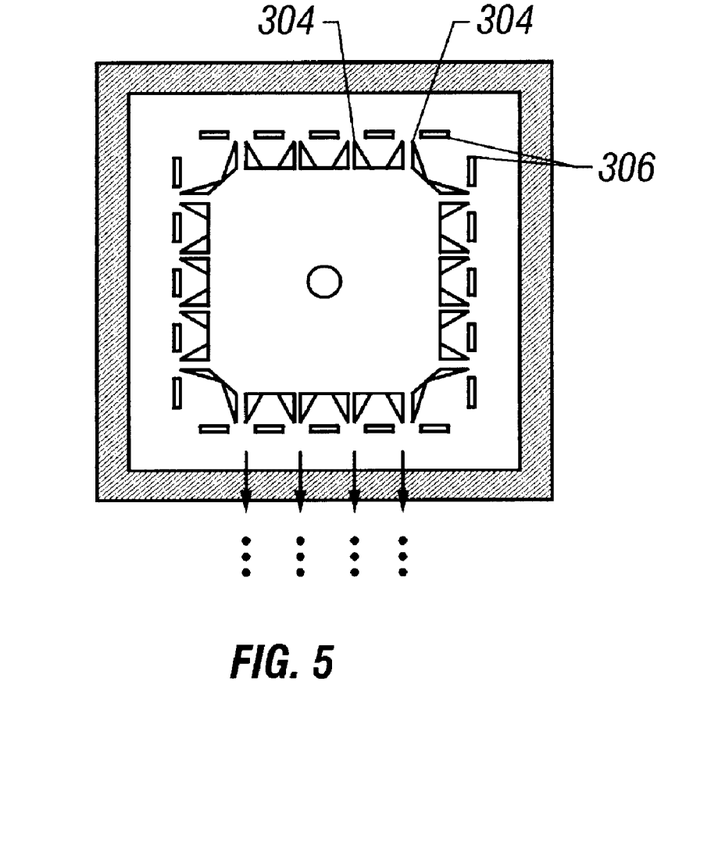
FIG. 5 is a plan view of an emitter/extractor structure in a thruster module according to an embodiment.

The emitters in the thruster module may be arranged in an array, with emitters pointing in four directions, as shown in FIG. 5. Approximately 2 $\mu$N of thrust may be generated per tip, with about 12 mW of power required per tip. An emitter array including 25 tips on a side may produce a thrust level of about 50 $\mu$N at a power level of 0.3 W. Multiple parallel tip and gate structures may be fabricated, all feeding into the same accelerator channel.

Figure 6:
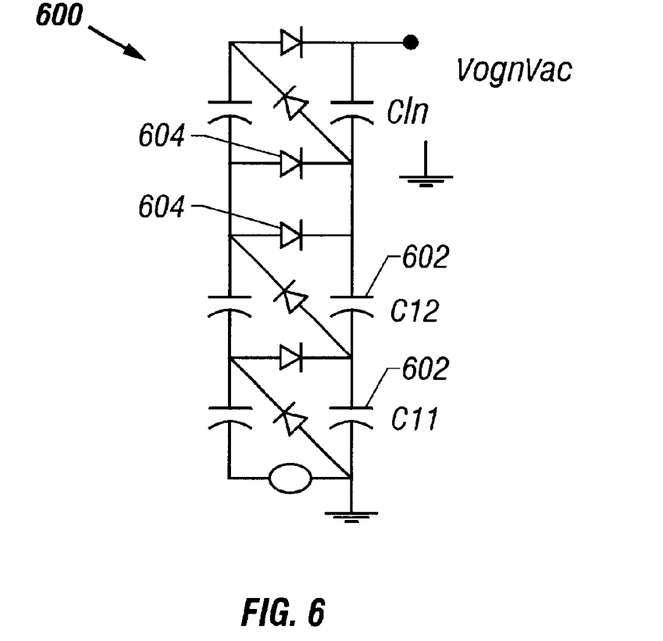
FIG. 6 is a schematic diagram of a power conditioning circuit according to an embodiment.

A lightweight, low current, 10 kV power supply may be constructed using a circuit 600 including a hybrid stacked array of capacitors 602 and diodes 604, as shown in FIG. 6. In this circuit, application of an alternating voltage ($V_{ac}$) to the input of the array causes the diodes 604 to charge the capacitors 602 in the negative half of each AC cycle. This forces the capacitors into a series connection producing a higher output voltage, Vo ($\approx nV_{ac}$) in the positive half of the cycle. For example, a microtransformer may be used to convert the 5 V bus voltage to an input voltage ($V_{ac}$) of 1 kV, and a ten-stage stack can produce a voltage ($V_o$) of 10 kV from the 1 kV input voltage.

The emitter/extractor assembly of the thruster module may be fabricated into an SOI wafer that includes a top 30 $\mu$m thick layer of silicon, a middle layer of 1 $\mu$m thick silicon dioxide, and a bottom layer of 400 $\mu$m thick silicon. The emitter/extractor geometry of the device may be etched into the top 30 $\mu$m layer of silicon using a DRIE system that anisotropically etches away the silicon. A masking layer composed of a thin layer of photoresist may be used to define the desired structural features. Aspect ratios of about 30 to 1 may be obtained with this method, and feature sizes as small as 1 $\mu$m wide by 30 $\mu$m tall may be formed.

The underlying silicon dioxide layer of an SOI wafer may act as an etch stop to the top layer etching step. This ensures that the etched structures on neighboring chips on the wafer have a uniform depth. The silicon dioxide layer also provides electrical isolation between the biased silicon structures that have been etched.

Propellant and electrical vias in the top 30 $\mu$m silicon layer may be etched from the backside of the wafer using the DRIE system through the 400 $\mu$m bulk silicon layer. A Reactive Ion Etch (RIE) system may be used to etch the silicon dioxide layer. Vias are etched through the silicon dioxide layer to enable electrical contact to the extractor electrodes. A Pyrex® cover wafer may be anodically bonded to the silicon wafer. Anodic bonding allows for low temperature (<400° C.) hermetic seals between the SOI wafer and the cover wafer. The use of the cover wafer places the emitter/extractor structure into the center of the assembly, between the outer chips including the accelerator electrodes, thereby providing sufficient spacing in the vertical direction to avoid beam impingement over the 5 mm extractor/accelerator electrode gap. The accelerator electrodes 406 may be metal deposited onto the silicon chips 404, which are subsequently bonded to the SOI/Pyrex® assembly of the thruster module. The silicon chips 404, which include the accelerator electrodes 406, may be epoxy bonded to the SOI/Pyrex® assembly. Vias etched into the silicon chips 404 overlap corresponding vias etched into the SOI wafer to allow for electrical contact with of the extractor electrodes 306. The emitter may be contacted through the electrically conductive propellant fluid.

Figure 7:
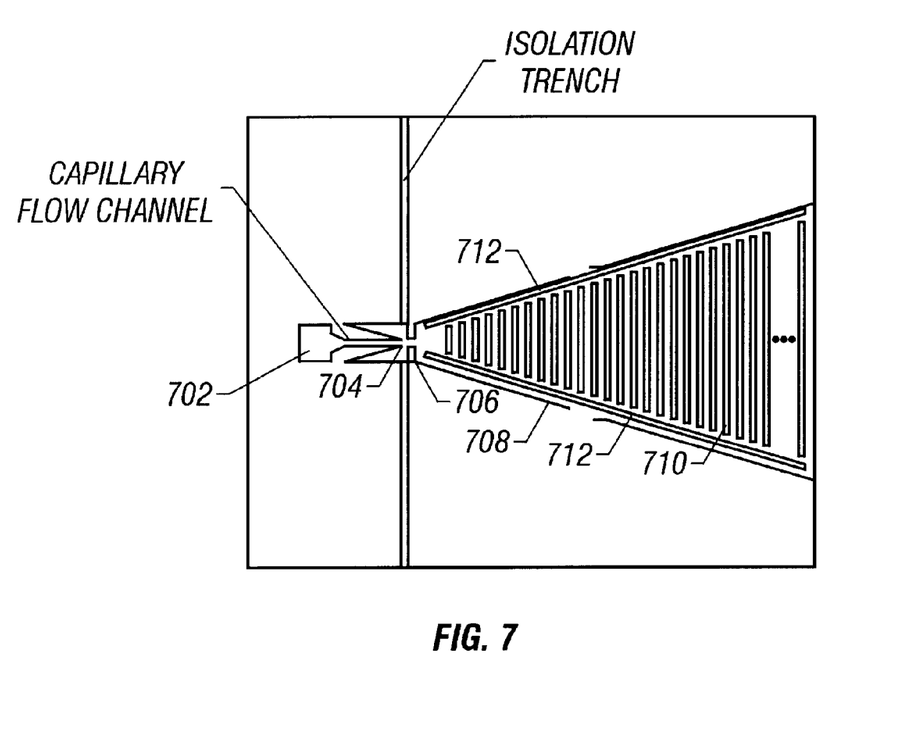
FIG. 7 as a plan view of an emitter including an accelerator electrode array according to an embodiment.

In another embodiment, a multi-stage accelerator system, as shown in FIG. 7, is used to increase the bus voltage. The propellant inlet 702, emitter tip 704, and extractor electrode 706 may be arranged as described above. A conical multi-stage accelerator section 708 accelerates the beam of charged droplets. The accelerator electrodes 710 may be thin metal films about 20 $\mu$m wide that are deposited into the channel on the insulator layer of the SOI wafer. Electrodes in the accelerator section 708 may be separated by a gap of about 20 $\mu$m.

A pulsed DC voltage with a maximum amplitude of 100 V applied between electrode pairs may be phased so that a droplet traveling downstream through the accelerator section 708 always experiences an accelerating electric field. Applying a different voltage between any two adjacent accelerator electrodes 710 creates fringing electric fields. Any charged droplet caught in the fringing field accelerates due to the resulting electrostatic force. When a properly phased set of voltages are applied between electrodes 710 of the accelerator, a droplet can continue to accelerate as it passes through each inter-electrode gap.

Figure 8:
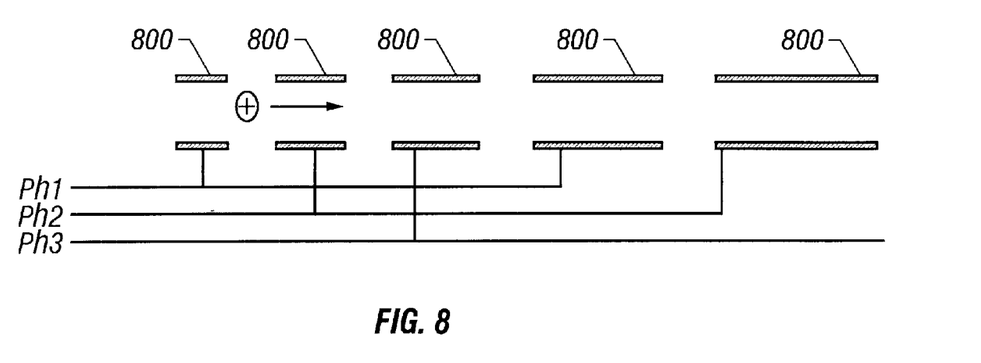
FIG. 8 is a schematic diagram of an accelerator electrode array with variable length electrodes according to an embodiment.
Figure 9:
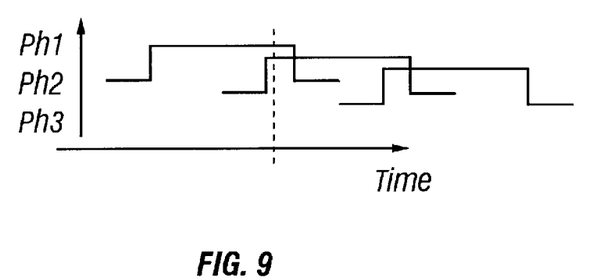
FIG. 9 is a timing diagram for voltage pulses in accelerator electrodes in an accelerator electrode array according to an alternate embodiment.

The increase in speed of the droplets through the array causes a phase change between the location of the droplet and the timing of the applied voltage. In one embodiment, variable length electrodes 800 are used to compensate for this phase change, as shown in FIG. 8. In another embodiment, the accelerator electrodes have the same length, but a variable timing delay, such as that shown in the timing diagram of FIG. 9, to compensate for the phase change.

Figure 10:
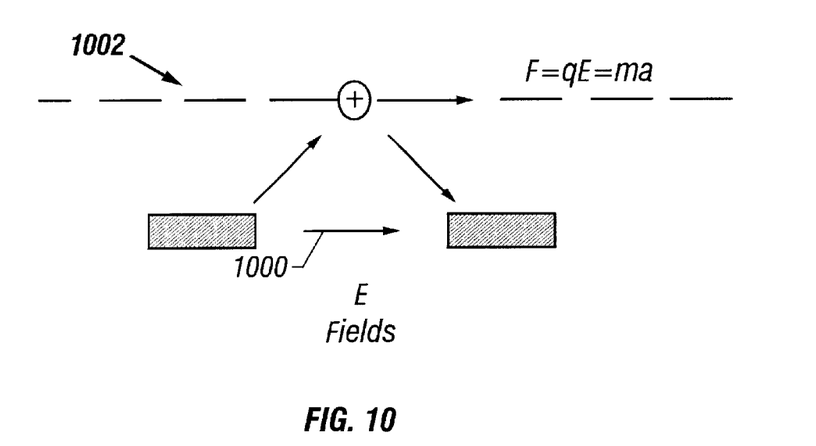
FIG. 10 is a schematic diagram of a charged droplet being accelerated by adjacent electrodes in an accelerator electrode array according to an embodiment.

The directional force of the fringing field influences the flow of an off-axis charged droplet through an array. The horizontal component 1000 of the field points in the same direction throughout the accelerator section, accelerating the droplet through the array. The vertical component of the field points towards the accelerator channel centerline 1002 in the first half of the gap and away from the centerline 1002 in the second half of the gap, as shown in FIG. 10. The direction of the vertical field results in a focusing or de-focusing force for the charged droplets. If the two vertical vectors are equal in size, the net force is zero. However, any non-zero net vector may result in unwanted collisions with the accelerator chamber walls. The use of rectangular waveforms over sine waves may be make it easier to maintain a zero net vector.

In an embodiment, 100 electrodes may be used to produce a total voltage drop of 10 kV. The overall length of the accelerator array may be about 4 mm.

Apart from accelerating the droplet beam, the accelerator electrodes may also prevent beam de-focusing in the vertical direction. In order to provide beam focusing in the horizontal direction, electrostatic guide electrodes 712 (FIG. 7) may also be deposited into the accelerator section 708, both on the exposed silicon dioxide surface of the silicon wafer and on the Pyrex® wafer. These guide electrodes run the length of the channel and may be charged positively. Different voltages may be applied to the guides on both sides of the channel to provide thrust vectoring.

The use of linear arrays of emitter tips allows for the activation of only certain segments of the array, in effect causing "electrostatic gimballing" of the thruster. Varying the potential applied to the two guide electrodes may further amplify vectoring of the charged droplet beam, thus avoiding the necessity of mechanical gimbals.

Figure 11:
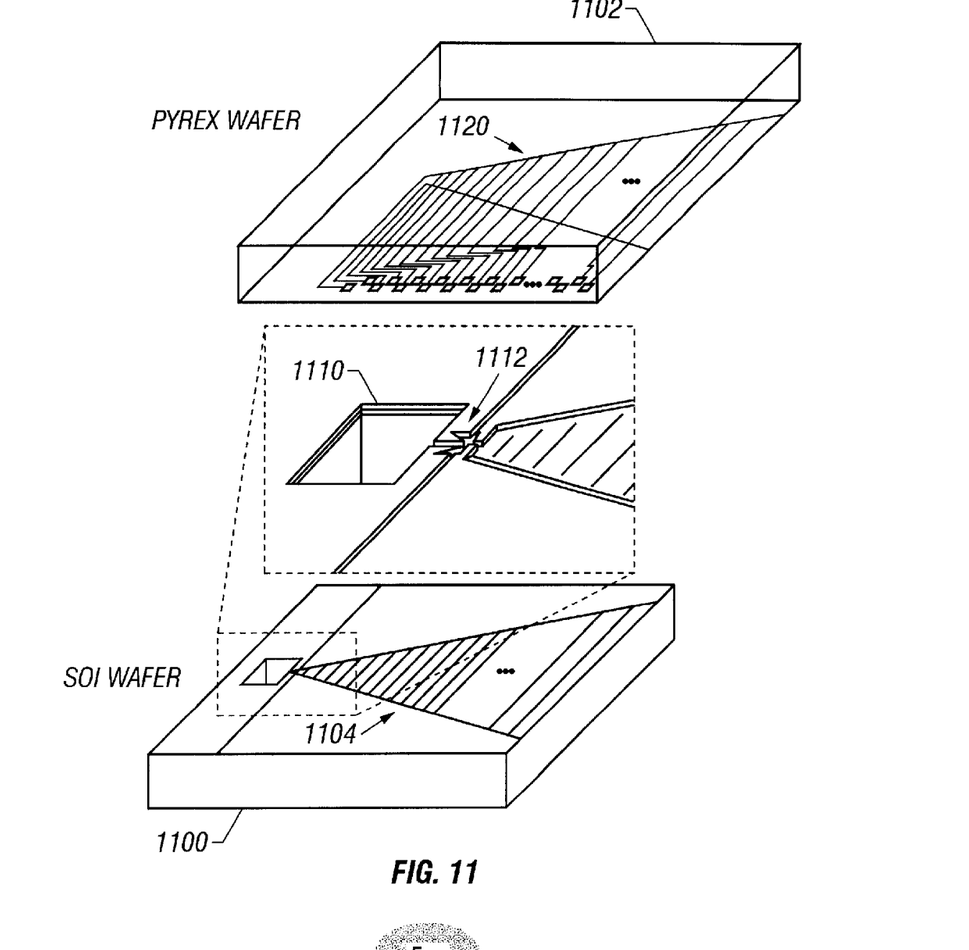
FIG. 11 is an exploded perspective view of an emitter assembly in the thruster module according to an embodiment.

The thruster module may be divided into two chips 1100, 1102, as shown in FIG. 11. A first set of accelerator electrodes 1104 may be provided on the SOI chip 1100, which includes the propellant inlet 1110, emitter and extractor electrodes. A second set of accelerator electrodes 1120 may be provided on a Pyrex® cover chip 1102, which is anodically bonded to the SOI chip 1100. The chips may be fabricated using MEMS techniques. The accelerator electrodes 710 and guide electrodes 712 in the accelerator section may be deposited as patterned metal layers using an e-beam evaporator and photolithography techniques. These metal layers may be deposited onto the exposed silicon dioxide areas after DRIE of the top 30 µm layer.

Figure 12:
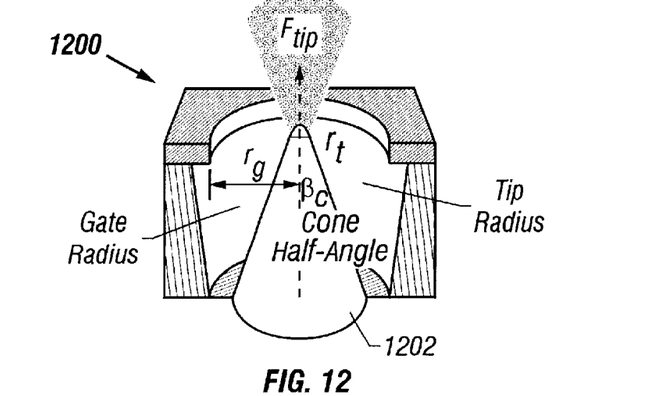
FIG. 12 is a partial cross-section of a Field Emitter Array (FEA) cathode according to an embodiment.

A Field Emitter Electrode (FEA) cathode 1200 may be provided on the thruster module to neutralize the beam of charged droplets. The FEA cathode 1200 may have a packing density of greater than $10^7$ tips/cm$^2$ (one tip 1202 is shown in FIG. 12) and operating voltages below 50 V. Different types of cathode materials may be used, including, for example, HfC and ZrC cathodes and Vertical Current Limiting (VECTL) architectures. The cathode may be integrated with Cathode Lens and Ion Repeller (CLAIR) grids, among other, to reduce tip sputter erosion.

A micro-colloid thruster according to an embodiment fits on a chip approximately 0.5×0.5×0.1 cm$^3$. The thruster may require about a third of a Watt of power, provide about 50 µm thrust, and generate pulses of from about 500 seconds to 2000 seconds. The controller 210 may control the amount and direction of thrust by selectively activating emitters in the array. The controller 210 may also control the direction of thrust by applying different voltages to the guide electrodes 712 in the accelerator section 708.

A micro-colloid thruster system according to the various embodiments may be used as the main propulsion system in microspacecraft. The thruster system may also be used in larger spacecraft for precise maneuvering operations. These operations may include, for example, fine attitude control, orbit maintenance (drag makeup), and formation operations involving several spacecraft.

A number of embodiments have been described. Nevertheless, it will be understood that various modifications may be made without departing from the spirit and scope of the invention. Accordingly, other embodiments are within the scope of the following claims.

What is claimed is:

1. A method for producing thrust, comprising:
   producing an electric field at an emitter tip with an extraction voltage;
   extracting a beam of charged droplets from the emitter tip;
   converting a bus voltage in a range of about 3 V to 5 V to an accelerator voltage in a range of about 2 kV to 20 kV;
   accelerating the charged droplets in the beam with the accelerator voltage to produce thrust;
   providing a plurality of emitters in an array, each emitter including an emitter tip;
   controlling the amount of thrust by selectively activating emitters in the array.

2. A method for producing thrust, comprising:
   producing an electric field at an emitter tip with an extraction voltage;
   xtracting a beam of charged droplets from the emitter tip;
   converting a bus voltage in a range of about 3 V to 5 V to an accelerator voltage in a range of about 2 kV to 20 kV;
   accelerating the charged droplets in the beam with the accelerator voltage to produce thrust;
   providing a plurality of emitters in an array, each emitter including an emitter tip;
   controlling a direction of thrust by selectively activating emitters in the array.

3. A method for producing thrust, comprising:
   producing an electric field at an emitter tip with an extraction voltage;
   extracting a beam of charged droplets from the emitter tip;
   converting a bus voltage in a range of about 3 V to 5 V to an accelerator voltage in a range of about 2 kV to 20 kV;
   accelerating the charged droplets in the beam with the accelerator voltage to produce thrust;
   providing a plurality of accelerator electrodes in an array, said array including a first accelerator electrode and a plurality of downstream accelerator electrodes;
   applying a first voltage to the first accelerator electrode;
   increasing the first voltage to the accelerator voltage using the downstream accelerator electrodes; and
   providing guide electrodes in the accelerator electrode array; and
   controlling a direction of the beam of charged droplets by applying a voltage-to each of the guide electrodes to control.

4. A micro-colloid thruster system comprising:
   a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;

a bus operative to supply a bus voltage in a range of about 3 V to 5 V;
a voltage converter operative to increase the bus voltage to an accelerator voltage in a range of about 2 kV to 20 kV; and
an accelerator electrode operative to accelerate the beam of charged droplets with said accelerator voltage;
the thruster system further comprising a controller operative to activate one or more emitters.

5. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;
a voltage converter operative to increase the bus voltage to an accelerator voltage in a range of about 2 kV to 20 kV; and
an accelerator electrode operative to accelerate the beam of charged droplets with said accelerator voltage;
wherein a plurality of the emitters are arranged in different directions.

6. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;
a voltage converter operative to increase the bus voltage to an accelerator voltage in a range of about 2 kV to 20 kV; and an accelerator electrode operative to accelerate the beam of charged droplets with said accelerator voltage;
wherein a plurality of the emitters are arranged in different directions;
wherein a plurality of said emitters are provided on each side of a four-sided array.

7. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;
a voltage converter operative to increase the bus voltage to an accelerator voltage in a range of about 2 kV to 20 kV; and an accelerator electrode operative to accelerate the beam of charged droplets with said accelerator voltage;
wherein the voltage converter comprises:
 a transformer to convert the bus voltage to an intermediate voltage; and
 a stacked array of capacitors and diodes to convert the intermediate voltage to the accelerator voltage.

8. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;
a voltage converter operative to increase the bus voltage to an accelerator voltage in a range of about 2 kV to 20 kV; and an accelerator electrode operative to accelerate the beam of charged droplets with said accelerator voltage;
wherein the voltage converter includes an accelerator section comprising:
 a first accelerator electrode;
 a plurality of intermediate accelerator electrodes, each intermediate accelerator electrode operative to generate a higher voltage than the adjacent upstream accelerator electrode; and
 a terminal accelerator electrode operative to generate the accelerator voltage from the adjacent upstream intermediate accelerator electrode;
wherein the accelerator section further comprises two or more guide electrodes operative to guide the charged droplets through the accelerator section.

9. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;
a voltage converter operative to increase the bus voltage to an accelerator voltage in a range of about 2 kV to 20 kV; and
an accelerator electrode operative to accelerate the beam of charged droplets with said accelerator voltage;
wherein tne voltage converter includes an accelerator section comprising:
 a first accelerator electrode;
 a plurality of intermediate accelerator electrodes, each intermediate accelerator electrode operative to generate a higher voltage than the adjacent upstream accelerator electrode; and
 a terminal accelerator electrode operative to generate the accelerator voltage from the adjacent upstream intermediate accelerator electrode;
wherein the accelerator section further comprises two or more guide electrodes operative to guide the charged droplets through the accelerator section;
the thruster system further comprising a controller operative to control a direction of the beam of charged droplets by controlling a voltage on each of the guide electrodes.

10. A micro-colloid thruster system comprising:
a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;
a bus operative to supply a bus voltage in a range of about 3 V to 5 V;

a voltage converter operative to increase the bus voltage to an accelerator voltage in a range of about 2 kV to 20 kV; and an accelerator electrode operative to accelerate the beam of charged droplets with said accelerator voltage;

wherein the plurality of emitters, bus, voltage converter, and accelerator electrodes are provided in a micro electromechanical system (MEMS)thruster module wherein the MEMS thruster module comprises a semiconductor material.

11. A micro-colloid thruster system comprising:

a plurality of emitters, each emitter including a propellant inlet adapted to receive a liquid propellant, an emitter tip, and an extractor electrode adjacent to the emitter tip and operative to provide a voltage sufficient to extract a beam of charged droplets of the liquid propellant from the emitter tip;

a bus operative to supply a bus voltage in a range of about 3 V to 5 V;

a voltage converter operative to increase the bus voltage to an accelerator voltage in a range of about 2 kV to 20 kV; and an accelerator electrode operative to accelerate the beam of charged droplets with said accelerator voltage;

wherein the plurality of emitters, bus, voltage converter, and accelerator electrodes are provided in a micro electromechanical system (MEMS)thruster module;

wherein the MEMS thruster module comprises a semiconductor material;

wherein the semiconductor material comprises silicon.

* * * * *